US00RE38271E

(19) United States
(12) Reissued Patent
Kars

(10) Patent Number: US RE38,271 E
(45) Date of Reissued Patent: Oct. 14, 2003

(54) DRUM WITH DRUM CLOSURE AND METHOD

(75) Inventor: Herman P. Kars, Amstelveen (NL)

(73) Assignee: Koninklijke Emballage Industrie Van Leer BV, Amsterdam (NL)

(21) Appl. No.: 09/967,531

(22) Filed: Oct. 1, 2001

Related U.S. Patent Documents

Reissue of:
(64) Patent No.: 5,960,528
Issued: Oct. 5, 1999
Appl. No.: 09/104,484
Filed: Jun. 24, 1998

U.S. Applications:

(62) Division of application No. 08/897,792, filed on Jul. 21, 1997, now Pat. No. 5,853,100, which is a continuation of application No. 08/244,574, filed on Jul. 24, 1995, now abandoned.

(30) Foreign Application Priority Data

May 12, 1991 (NL) ..... 9102034

(51) Int. Cl.[7] ..... B21D 39/00; B23P 11/00
(52) U.S. Cl. ..... 29/511; 285/204; 220/601
(58) Field of Search ..... 29/511, 522.1; 200/254.1, 254.8, 288, 304, 601, 256.1, 259.3, 259.4, 378, 661; 285/203, 204

(56) References Cited

U.S. PATENT DOCUMENTS 1,997,203 A 4/1935 Shera
2,325,929 A * 8/1943 Amesbury et al. ..... 285/203
3,098,579 A 7/1963 Wheaton
3,208,775 A 9/1965 Stap et al.
3,219,230 A 11/1965 Housz et al.
3,894,331 A 7/1975 Ragetti
3,946,894 A 3/1976 Simkus
3,987,929 A 10/1976 Mineo
4,117,949 A 10/1978 Dwinell
4,706,836 A 11/1987 Greck

FOREIGN PATENT DOCUMENTS

GB 489896 8/1938
GB 763857 12/1956
GB 943148 11/1963

* cited by examiner

*Primary Examiner*—Nathan J. Newhouse

(57) ABSTRACT

A drum with a drum closure provided in a drum wall comprises an insert and a shut-off cap which can be placed in the insert which insert is situated in a collar on the drum wall pointing towards the outside of the drum and has a first flange which rests against the inside of the drum wall and a second flange which is flanged radially outwards over the collar and also a sealing ring which is wedged between the first flange and the inside of the drum wall. An additional seal which may or may not be connected to the sealing ring, is provided between the collar and the insert lying opposite in order to improve the sealing.

10 Claims, 3 Drawing Sheets

DRUM WITH DRUM CLOSURE AND METHOD

Matter enclosed in heavy brackets [ ] appears in the original patent but forms no part of this reissue specification; matter printed in italics indicates the additions made by reissue.

This application is a divisional application of U.S. patent application Ser. No. 08/897,792 filed Jul. 21, 1997 now U.S. Pat. No. 5,853,100, which is a continuation of Ser. No. 08/244,574 filed Jul. 24, 1995 now abandoned and claiming priority of Netherlands application 9102034 filed Dec. 5, 1991.

The invention relates to a drum with a drum closure provided in a drum wall comprising an insert for a shut-off cap or plug which can be placed in the insert which insert is situated in a collar on the drum wall pointing towards the outside of the drum and has a first flange which rests against the inside of the drum wall and a second flange which is flanged radially outwards over the collar and also a sealing ring which is wedged between the first flange and the inside of the drum wall.

Such a drum is generally known. When the insert is being fitted in the drum wall the first flange is firmly pressed against the drum wall in such a way that the sealing ring is compressed to provide the required seal. The second flange is then flange over the collar. The result of this is that the sealing ring can be held firmly wedged with pre-tension between the first flange and the drum wall.

The required sealing of the closure is maintained so long so the sealing ring can be held firmly wedged in this way. However, as soon as the wedging reduces, the risk of leakages occurs. Such a reduction of the wedging can occur if the drum falls from a certain height onto a hard surface with the closure down. The insert which projects relative to the drum wall is pressed inwards in this case which results in the first flange and the drum wall being pressed apart.

As a result of its elasticity the sealing ring can absorb deformations up to a certain level without leakages occurring. However, if the deformations become too great, as is mostly the case when the drum falls, the seal cannot still be guaranteed. The objective of the invention is therefore to equip a drum of the type described above with an improved closure in such a way that even if the drum falls on the closure the seal will still remain.

This object is achieved through the fact that an additional seal, which may or may not be connected to the sealing ring, is provided between the collar and the insert lying opposite. As a result of the position of the additional seal between the collar and the insert it is ensured that the sealing is maintained even if the insert is pressed inwards relative to the collar as the result of a fall.

The additional seal can be obtained in various ways. According to a first possibility, the additional seal is a loose second sealing ring which is compressed in the radial direction between collar and insert. In this case the insert can slide inwards along with the sealing ring without the pre-tension with which it is held wedged relative to the collar decreasing. Thus even quite large deformations of the drum wall and the insert can be absorbed without leakages being able to occur.

According to a second possibility, the additional seal is a loose second sealing ring which is compressed in the axial direction between the end face of the collar and the flanged part of the second flange of the insert. If the drum now falls with its closure onto a hard surface, the second sealing ring is compressed to a greater extend. The seal between insert and collar is therefore also maintained in this case.

In the case of the embodiments described above the two sealing rings can be made of different materials. This means that the original sealing ring which is in contact with the drum contents can be made of a material suitable for that purpose. On the other hand, a material which is capable of undergoing great compression can be selected for the additional sealing ring. It is also important here that this material should have a low coefficient of friction with regard to the metal collar and the insert in view of the great displacements which occur when they are compressed in the radial direction.

If the choice of material is not important, according to a third embodiment, the additional seal can be a sealing ring part which is fixed to the sealing ring and lies on the side of the sealing ring facing away from the first flange. In that case the whole sealing ring is preferably made of material with a low coefficient of friction.

An embodiment of the invention will be explained in greater detail below with reference to an exemplary embodiment shown in the figures.

Figure 1:
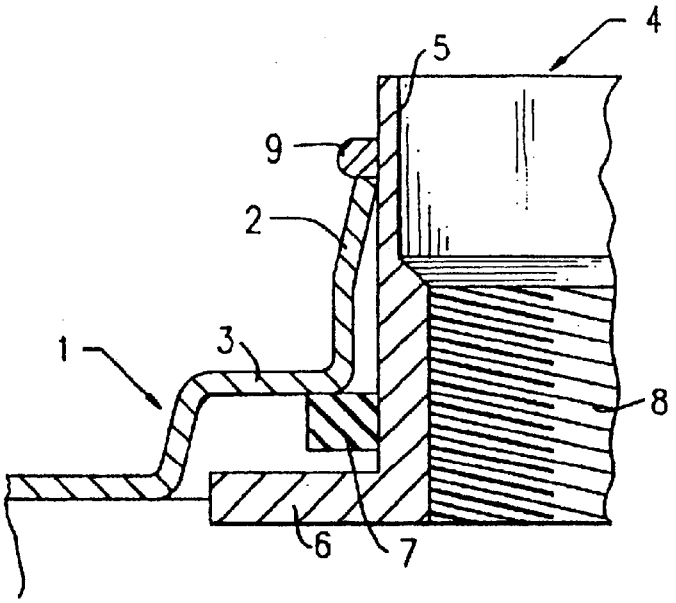
FIG. 1 shows a second embodiment of the drum closure according to the invention before it is fixed on the drum wall.
Figure 2:
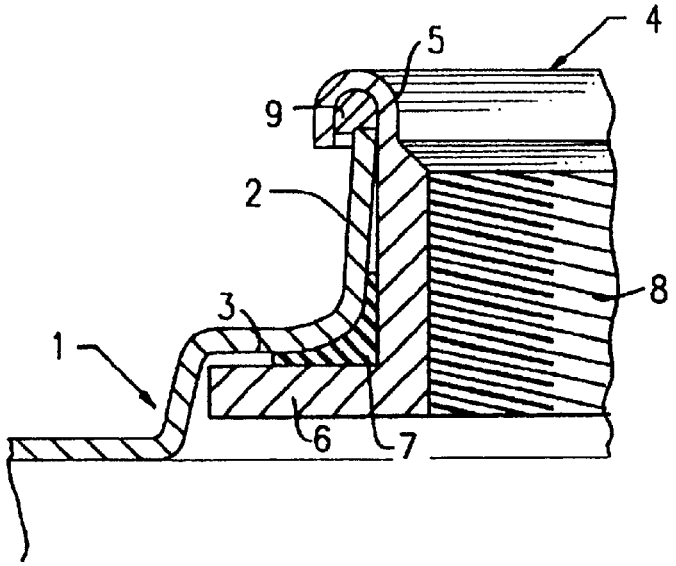
FIG. 2 shows the completed drum closure.
Figure 3:
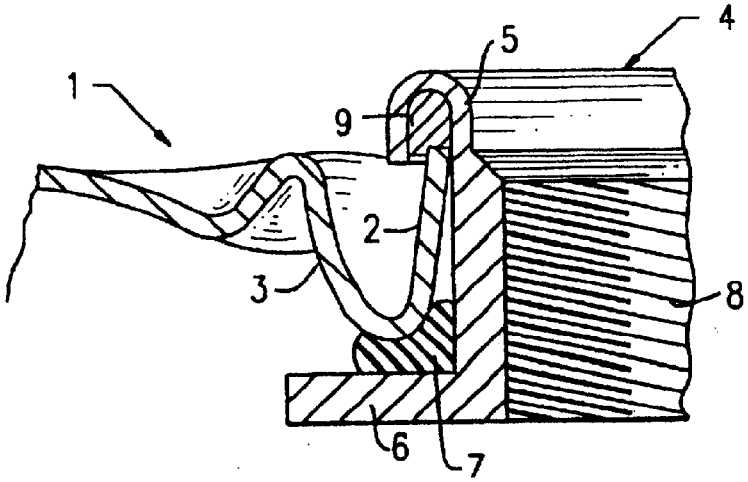
FIG. 3 shows the drum closure according to FIG. 2 in the deformed state.

In the embodiment shown in FIGS. 1, 2 and 3 the drum wall is indicated by 1. An outward pointing collar 2 is formed in this drum wall and connects by means of the recessed wall part 3 to the remainder of drum wall 1. In the situation shown in FIG. 1 the insert, indicated in its entirety by 4, is inserted into collar 2 while its second flange 5 projects outwards relative to collar 2. Insert 4 also has a first flange 6 which lies opposite the recessed wall part 3. A sealing ring 7 is provided between said wall part 3 and flange 6. The insert also has an internal screw thread 8 into which another closing plug, not shown, can be screwed.

For fixing the insert 4 to drum wall 1, flange 6 and wall part 3 are pressed towards each other in the course of which sealing ring 7 is compressed. In that state the flange 5 is flanged over collar 2 with the result that the sealing ring can be held under pre-tension. According to the invention an additional sealing ring 9 is now placed on the end face of collar 2 and is also compressed when flange 2 is flanged.

In the completed state shown in FIG. 2, it can be seen that there is a double seal between the insert 4 and drum wall 1 namely at the position of sealing ring 7 and at the position of the additional sealing ring 9.

However, when there are great deformations, for example, those which occur as the result of the drum falling with the closure facing down, the situation shown in FIG. 3 occurs. The insert 4 is pressed greatly inwards with the result that the flange 6 has come to lie at a greater distance from wall part 3. A great part of the pre-tension in sealing ring 7 is consequently lost which could give rise to leakages.

As also shown in FIG. 3, the pre-tension of the additional sealing ring 5 has not, however, decreased so that the correct seal has been retained at that point.

Figure 4:
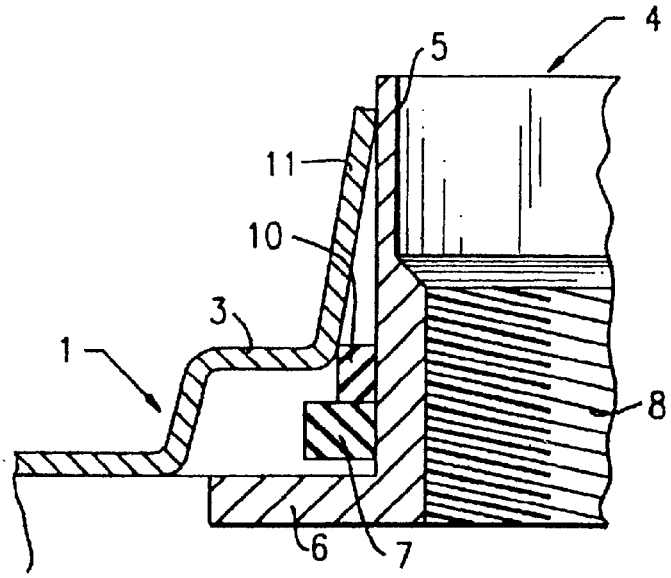
FIGS. 4, 5 and 6 show a first embodiment.
Figure 5:
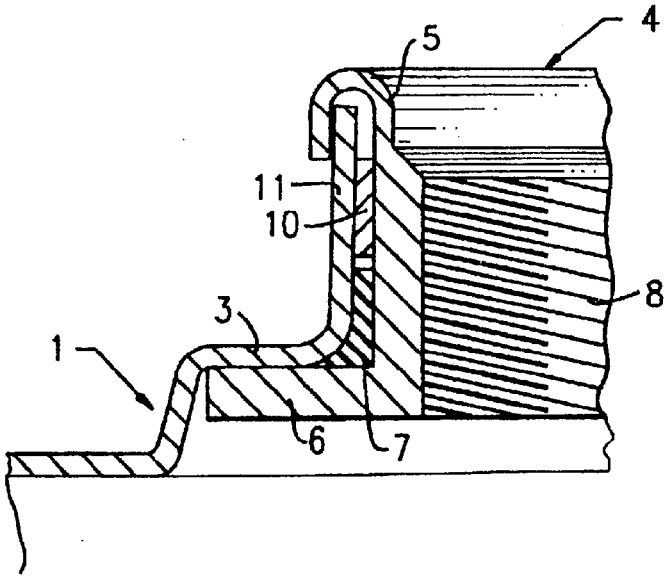
Figure 6:
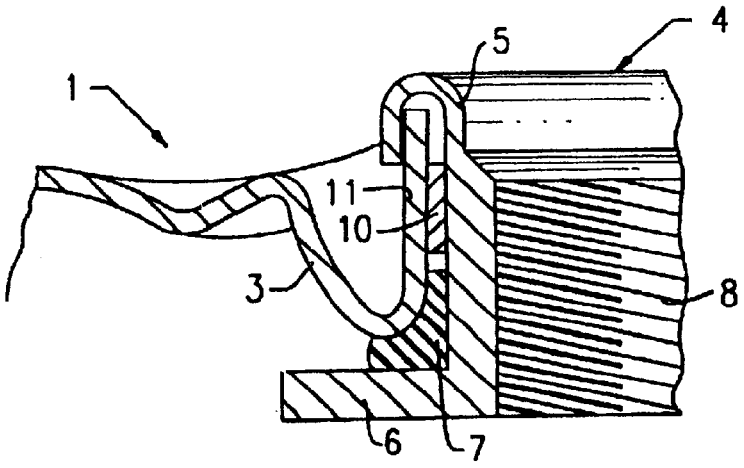

In the case of the variant shown in FIGS. 4–6 the additional sealing ring 10 of slightly smaller vertical cross sectional area, is fitted directly beside the sealing ring 7. In order to ensure that the additional sealing ring 10 goes into the correct position between the insert 4 and the collar 11 when the insert 4 is connected to the drum wall 1, the collar 11 is widened a little at the underside. It should be noted that variations in the insertion or pressing method may be employed. For example, the drum wall can be completely formed with the opening the collar and the embossment. The insert is than pressing into the drum wall formation and the second insert flange curled or flanged over the top of the drum wall collar. In an alternative insertion variation the drum wall is perforated and formed directly over the insert so that the embossment instead of being formed as a first step, is formed over the insert first flange as a last step. The end results, however, are the same.

During the compression of insert 4 and drum wall 1 the additional sealing ring 10 can consequently go into the position shown in FIG. 5. Comparing FIG. 4 with FIG. 5 it can be seen that during the pressing or insertion process the upstanding collar 11 is transformed from a conical configuration with the free end of the collar in contact with the insert to a substantially cylindrical form parallel to the exterior surface of the insert 4. In this case it is radially compressed and is consequently largely unaffected by the sliding inwards of the insert 4 as the result of a fall. See FIG. 6 wherein only the radiused juncture portion between the recessed drum wall part 3 and the collar 11 remains in contact with the first sealing ring 7.

Figure 7:
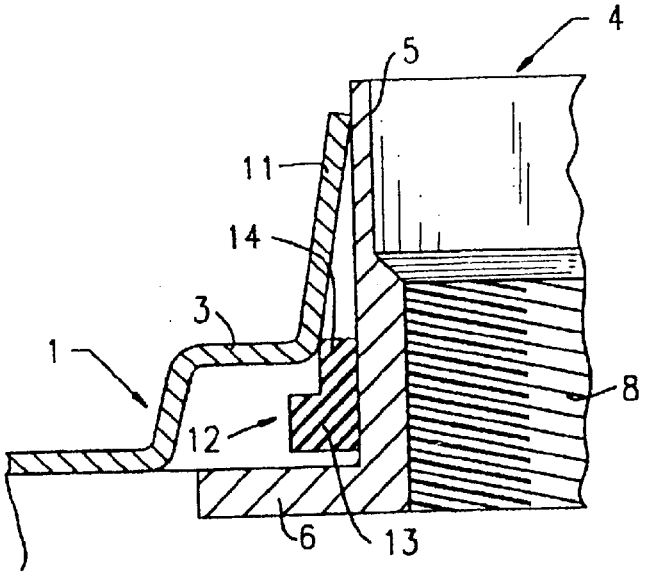
FIGS. 7, 8 and 9 show a third embodiment.
Figure 8:
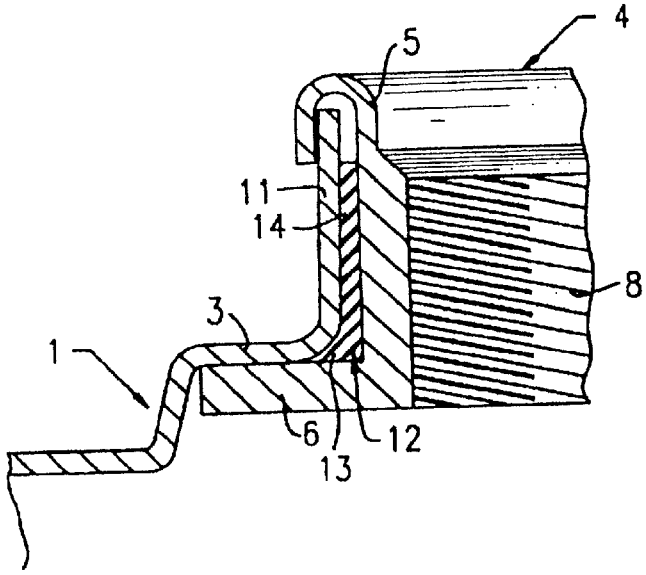
Figure 9:
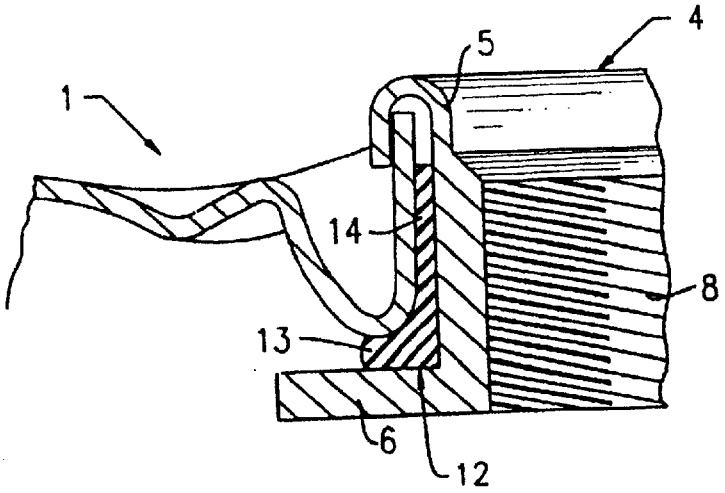

The variant shown in FIGS. 7–9 has a sealing ring 12 which is in one piece, and which essentially comprises the parts 13 and 14 which correspond to sealing rings 7 and 10 according to FIGS. 4–6. In this case also the collar 11 is widened a little at the underside. When insert 4 and end wall 1 are fixed part 14 of sealing ring is now compressed radially and is therefore unaffected by shifts. When deformations occur the part 13 can expand but this is not at the expense of the overall seal.

I claim:

1. A method of inserting a closure in a drum wherein said closure includes an internally threaded unitary cylindrical insert having a lowermost first flange, an uppermost second flange, a first sealing ring surrounding said insert adjacent said first flange and a second sealing ring positioned beside said first sealing ring surrounding said insert axially spaced from said first flange comprising the method steps of perforating an opening in a wall of the drum and introducing the insert through said opening from an undersurface of the drum wall, drawing an upwardly extending conical collar around the drum wall opening, compressing the second sealing ring between an insert outer cylindrical surface and a collar internal conical surface, causing the conical collar to move radially outwardly in spaced relationship to the insert outer cylindrical surface, compressing the first sealing ring between the insert first flange and the undersurface of the drum wall, curling the second flange over a top of the drum wall collar and forming a raised embossment in the drum wall surrounding the collar and overlying the insert first flange.

2. A method of inserting a closure in a drum wherein said closure includes an internally threaded unitary cylindrical insert having a lowermost first flange, an uppermost second flange, a first sealing ring surrounding said insert adjacent said first flange and a second sealing ring positioned beside said first sealing ring surrounding said insert axially spaced from said first flange comprising the method steps of perforating an opening in a wall of the drum and drawing an upwardly extending conical collar and raised embossment around the drum wall opening, introducing the insert through said opening from an undersurface of the drum wall, compressing the second sealing ring between an insert outer cylindrical surface and a collar internal conical surface, causing the conical collar to move radially outwardly in spaced relationship to the insert outer cylindrical surface and curling the second flange over a top of the drum wall collar and compressing the first sealing ring between the insert first flange and the undersurface of the drum wall embossment.

3. A method of inserting a closure in a drum wherein said closure includes an internally threaded unitary cylindrical insert having a lowermost first flange, an uppermost second flange, a first sealing ring surrounding said insert adjacent said first flange and a second sealing ring positioned beside said first sealing ring surrounding said insert axially spaced from said first flange comprising the method steps of perforating an opening in a wall of the drum and drawing an upwardly extending conical collar around the drum wall opening, seating the insert in said opening from an undersurface of the drum wall, compressing the second sealing ring between an insert outer cylindrical surface and a collar internal conical surface causing the conical collar to move radially outwardly in spaced relationship to the insert outer cylindrical surface, compressed the first sealing ring between the insert first flange and the undersurface of the drum wall and curling the second flange over the top of the drum wall collar.

4. The method as in claim 3 and forming a raised embossment in the drum wall surrounding the collar.

5. The method as in claim 3 wherein the step of compressing the second sealing ring between the insert and the collar causes the collar to move radially outwardly in spaced relationship to the insert so that said conical collar becomes substantially cylindrical, parallel to the insert outer cylindrical surface.

*6. A method of inserting a closure in a drum wherein said closure includes an internally threaded unitary cylindrical insert having a lowermost first flange, an uppermost second flange, a first sealing ring part surrounding said insert adjacent said first flange and a second sealing ring part positioned beside said first sealing ring part surrounding said insert axially spaced from said first flange comprising the method steps of perforating an opening in a wall of the drum and introducing the insert through said opening from an undersurface of the drum wall, drawing an upwardly extending conical collar around the drum wall opening, compressing the second sealing ring part between an insert outer cylindrical surface and a collar internal conical surface, causing the conical collar to move radially outwardly in spaced relationship to the insert outer cylindrical surface, compressing the first sealing ring part between the insert first flange and the undersurface of the drum wall, curling the second flange over a top of the drum wall collar and forming a raised embossment in the drum wall surrounding the collar and overlying the insert first flange.*

*7. A method of inserting a closure in a drum wherein said closure includes an internally threaded unitary cylindrical insert having a lowermost first flange, an uppermost second flange, a first sealing ring part surrounding said insert adjacent said first flange and a second sealing ring part positioned beside said first sealing ring part surrounding said insert axially spaced from said first flange comprising the method of steps of perforating an opening in a wall of the drum and drawing an upwardly extending conical collar and raised embossment around the drum wall opening, introducing the insert through said opening from an undersurface of the drum wall, compressing the second sealing ring part between an insert outer cylindrical surface and a collar internal conical surface, causing the conical collar to move radially outwardly in spaced relationship to the insert outer cylindrical surface and curling the second flange over a top of the drum wall collar and compressing the first sealing ring part between the insert first flange and the undersurface of the drum wall embossment.*

*8. A method of inserting a closure in a drum wherein said closure includes an internally threaded unitary cylindrical insert having a lowermost first flange, an uppermost second flange, a first sealing ring part surrounding said insert adjacent said first flange and a second sealing ring part positioned beside said first sealing ring part surrounding said insert axially spaced from said first flange comprising the method steps of perforating an opening in a wall of the drum and drawing an upwardly extending conical collar around the drum wall opening, seating the insert in said opening from an undersurface of the drum wall, compressing the second sealing ring part between an insert outer cylindrical surface and a collar internal conical surface causing the conical collar to move radially outwardly in spaced relationship to the insert outer cylindrical surface, compressing the first sealing ring part between the insert first flange and the undersurface of the drum wall and curling the second flange over a top of the drum wall collar.*

*9. The method as in claim 8 and forming a raised embossment in the drum wall surrounding the collar.*

*10. The method as in claim 8 wherein the step of compressing the second sealing ring part between the insert and the collar causes the collar to move radially outwardly in spaced relationship to the insert so that the conical collar becomes substantially cylindrical, parallel to the insert outer cylindrical surface.*

* * * * *